United States Patent [19]

Skudera, Jr. et al.

[11] Patent Number: 5,295,151
[45] Date of Patent: Mar. 15, 1994

[54] TRANSITION DETECTION CIRCUIT FOR PSK SIGNALS USING THE SAW CHIRP-Z ALGORITHM (U)

[75] Inventors: William J. Skudera, Jr., Manasquan, N.J.; Charles E. Konig, Staten Island, N.Y.

[73] Assignee: The United States of America as represented by the Secretary of the Army, Washington, D.C.

[21] Appl. No.: 820,394

[22] Filed: Oct. 22, 1985

[51] Int. Cl.$^5$ .............................................. H04L 27/22
[52] U.S. Cl. .......................................... 375/1; 375/83
[58] Field of Search ............... 375/83, 84, 1; 329/112, 329/137; 342/424, 442, 19; 364/485

[56] References Cited

U.S. PATENT DOCUMENTS

| H292 | 6/1987 | Klose et al. | 342/424 |
|---|---|---|---|
| 4,054,841 | 10/1977 | Henaff et al. | 329/137 |
| 4,443,801 | 4/1984 | Klose et al. | 342/442 |
| 4,575,684 | 3/1986 | Stamm | 375/84 |
| 4,583,047 | 4/1986 | Le Goff épouse Henaff et al. | 329/112 |
| 4,628,271 | 12/1986 | Takayama | 375/84 |
| 4,647,863 | 3/1987 | Skudera, Jr. et al. | 375/83 |
| 4,703,433 | 10/1987 | Shurrit | 364/485 |
| 4,965,581 | 10/1990 | Skudera et al. | 342/19 |

OTHER PUBLICATIONS

"The Versatility of the 'In-Line' SAW Chirp Filter" by W. J. Skudera, Jr., Processing of the 31st Annual Frequency Control Symposium (1977).
Surface Wave Transform Adaptable Processor System, by R. M. Hayes et al, 1975 Ultrasonics Symposium Proceedings, pp. 363-370.
Introduction to Radar Systems, by M. I. Skonik, McGraw-Hill Book Co. (1962) pp. 555-556.

Primary Examiner—Salvatore Cangialosi
Attorney, Agent, or Firm—Michael Zelenka; William H. Anderson

[57] ABSTRACT

This disclosure relates to a circuit for detecting the phase transitions in a PSK signal in the presence of a stronger CW signal. A SAW transform circuit carries out "piecewise" Chirp-Z transformations of the PSK and CW signals so as to achieve a separation of the same in the time domain. A gate and a pulse width discriminator are both coupled to the output of the Chirp-Z transform circuit. The discriminator rejects all signals except the transformed phase transitions of the PSK signal. The output of the discriminator is utilized to periodically enable the gate for short durations (e.g., 2nsec.) to selectively pass the transformed PSK signal including transformed phase transitions thereof. The gated output is delivered to a dual channel SAW differential delay line whose two channels are of different lengths to provide a predetermined amount of delay (t) therebetween (t≦PSK bit duration). A comparator serves to compare the output signals of said two channels and when they differ it produces an output pulse. A counter serves to count the output pulses from the comparator.

8 Claims, 2 Drawing Sheets

TRANSITION DETECTION CIRCUIT FOR PSK SIGNALS USING THE SAW CHIRP-Z ALGORITHM (U)

The invention described herein may be manufactured, used and licensed by or for the Government for governmental purposes without the payment to me of any royalties thereon.

TECHNICAL FIELD

The present invention relates to the signal processing of a particular class of RF signals and, more particularly, to a transition detector for determining the number of phase transitions in low level, phase shift keying (PSK) signals in the presence of strong C.W. signals.

BACKGROUND OF THE INVENTION

For certain applications (e.g., ELINT Radar) it is first necessary to detect the phase transitions in a PSK signal and, more particularly, to detect (and count) the phase transitions or chips in a low level PSK signal in the presence of strong (or stronger) CW signals. Attempts have been made to use phaselock loops for this purpose. Phaselock loops, however, usually take milliseconds to lock onto an unknown carrier, while the PSK signals of interest generally last only for microseconds with chip durations of only nanoseconds. Also, phaselock loops do not operate satisfactorily in the presence of multiple, interfering, signals.

SUMMARY OF THE INVENTION

It is a primary object of the present invention to detect (and count) the phase transitions in a low level PSK signal in the presence of strong CW signals.

The above and other objects are achieved in accordance with the present invention wherein an incoming PSK signal and strong (interfering) CW signal(s), if any, are coupled to a SAW Chirp-Z transform circuit, which, as the name implies, carries out a Chirp-Z transformation of the input signals. the Chirp modulation signal is of a duration less than or equal to the PSK bit duration. The transformed PSK signal and CW signal(s) are separated in the time domain. The phase transitions or chips of the transformed PSK signal appear as relatively wide pulses compared to a transformed CW signal which appears as a large narrow peak pulse. The transformed signals are coupled to a gate, and to a pulse width discriminator which rejects all pulses except the relatively wide pulses corresponding to the transformed chips of the PSK signal. The output of the discriminator is coupled to a sample-and-hold and pulser circuit that produces narrow (e.g., 2 nanoseconds) enabling pulses which periodically enable the gate to selectively pass the transformed PSK signal, while rejecting the transformed, strong CW signal(s). The gate output is delivered to a dual channel SAW differential delay line. The two channels or paths of the delay line provide a predetermined differential delay; i.e., the paths are of different length (D) so as to provide a desired differential delay ($\tau$) which, for example, is equal to the bit duration of a PSK bit. A comparator is coupled to the output of each channel or path and when these outputs differ an output signal is provided by the comparator which is indicative of a phase transition in the input PSK signal.

BRIEF DESCRIPTION OF THE DRAWINGS

The invention will be more fully appreciated from the following detailed description when the same is considered in connection with the accompanying drawings, in which.

DETAILED DESCRIPTION

Figure 1:
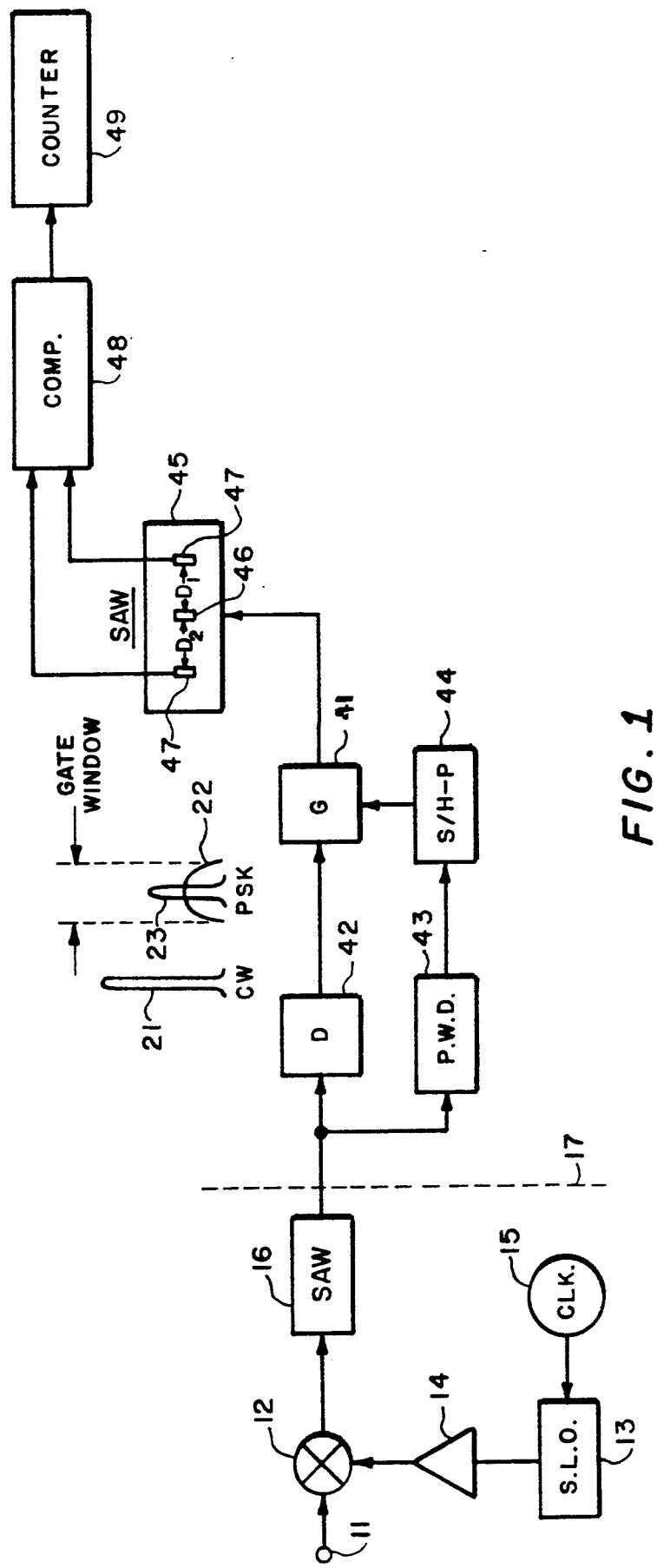
FIG. 1 is a schematic block diagram of a transition detector for a PSK signal in accordance with the present invention.

Referring now to FIG. 1 of the drawings, an incoming, low level, PSK signal is delivered to the input terminal 11 along with a possible interfering, stronger CW signal. These input signals are coupled to a first input of the mixer 12. The second input to mixer 12 is provided by the sweep or sweeping local oscillator (SLO) 13 via the amplifier 14. A sweep of local oscillator 13 is initiated periodically by a short duration impulse from clock 15. The SLO sweep is designed to be less than or no more than equal to the bit duration of the PSK signal. That is, SLO(t) $\leq \tau$, where $\tau$ is the bit duration of the PSK signal. By way of example, for a PSK signal duration of 10–100 microseconds and a bit duration of from 100 to 200 nanoseconds, the SLO sweep might typically be 50–200 nanoseconds. As will be apparent to those in the art, the mixing operation in mixer 12 effectively puts a Chirp-type modulation onto the input signal(s). The surface acoustic wave (SAW) device 16 is coupled to the output of mixer 12 and it has a frequency-vs-time characteristic that is complementary to that of SLO 13; i.e., it is the inverse match of the SLO slope characteristic. Again, to those in the art, it will be evident that the SLO/SAW devices comprise a "match filter" arrangement.

The SAW device 16 may comprise an ST-X quartz SAW substrate, with an input and an output transducer deposited on the surface thereof. A SAW device such as disclosed in the article "The Versatility of the 'In-Line' SAW Chirp Filter" by W. J. Skudera, Jr. Proceedings of the 31$^{st}$ Annual Frequency Control Symposium (1977), can be used for device 16. Since SAW devices, as well as phase shift keying (PSK), are so well known and so extensively described in the technical literature, any further detailed description herein would not appear to be warranted.

The circuit to the left of dotted line 17 in FIG. 1 performs the SAW Chirp-Z transform algorithm. The Chirp-Z transform has been known and used for various purposes for a number of years now; see, for example, the article "Surface Wave Transform Adaptable Processor System" by R. M. Hayes et al, 1975 Ultrasonics Symposium Proceedings, pp. 363–370, and one or more of the references cited therein. Briefly, when a CW signal is mixed with the Chirp signal from SLO 13 and this Chirp-modulated signal delivered to a SAW device 16 of proper matching parameters (e.g., a similar, but opposite frequency-vs-time characteristic), the result is that the CW signal is transformed in time into a narrow sin (x)/x function. However, since the phase transitions of the input PSK signal are comprised of a band of frequencies, the transformed chips or phase transitions will appear as low amplitude, wider pulse width signals.

In the absence of a phase transition, the transformed PSK signal looks like a narrow sin (x)/x function, albeit of smaller amplitude than the large spike of the transformed CW signal. FIG. 1 illustrates the large spike 21 of the transformed CW signal, the relatively wide pulse 22 of a transformed phase transition, and a small spike 23 corresponding to the PSK signal absent a phase transition. The pulses illustrated are what one would observe on an oscilloscope for many SLO Sweeps. Without a phase transition the PSK signal is, of course, essentially a CW signal. The important aspect of the Chirp-Z transformation of the input signals, and the aspect which is advantageously utilized herein, is that the transformed PSK signal parts and the transformed high level CW signal are separated in the time domain. Thus, the transformed PSK signal parts can be isolated from the transformed high level or strong CW signal, and the transformed strong CW readily rejected.

Figure 2:
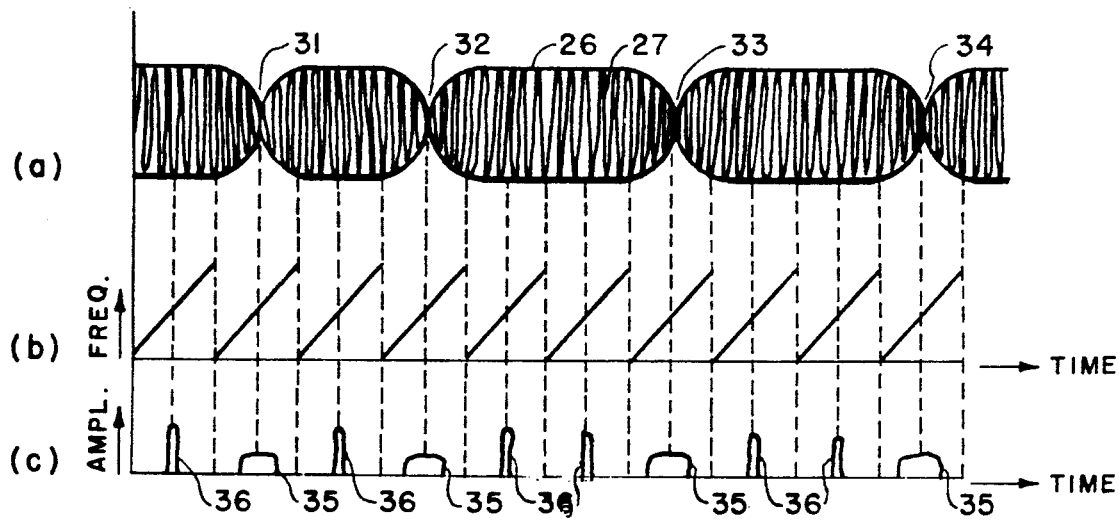
FIG. 2 shows waveforms which are useful in the explanation of the operation of the chirp-Z transform circuit used in the transition detector of FIG. 1.

FIG. 2 shows several waveforms which help to illustrate the operation of the Chirp-Z transform circuit of FIG. 1. The waveform (a) of FIG. 2 shows a PSK modulation signal 26 and, of course, the associated carrier signal 27. The PSK signal 26 is comprised of a number of chips or phase transitions, such as chips 31–34, with a chip rate of say 5 MHz. The carrier 27 has a frequency ($f_o$) that is preferably an integral multiple of the chip rate (e.g. 100 MHz). FIG. 2(b) shows the Chirp signal from the SLO 13. In practice, this Chirp signal may be of shorter duration. The SAW 16 has a similar dispersive characteristic or slope, but of course its slope is opposite that of the slope illustrated in FIG. 2b. As shown in FIG. 2(c), the transformed chips of the PSK signal appear as low amplitude, relatively wide pulse signals 35. And in the absence of a chip or phase transition, the transformed PSK signal appears as a narrow, sin (x)/x function, as illustrated at 36 in FIG. 2(c). For purposes of illustration, overall circuit delay, particularly that of SAW 16, has not been accounted for in FIG. 2(c). In fact, however, the pulses of FIG. 2(c) would be time-skewed somewhat to the right with respect to the other waveforms due to circuit delay.

The transformed output from SAW device 16 is coupled to gate 41 via the delay 42, the purpose of which will be described hereinafter. The output of SAW 16 is also coupled to the pulse width discriminator (P.W.D.) 43. The PWD 43 rejects all pulses except the relatively wide pulses corresponding to the transformed chips of the PSK signal. A pulse width discriminator such as described in the text "Introduction to Radar Systems" by M. I. Skolnik, McGraw-Hill Book Co. (1962) pp. 555–6, can be utilized herein. The output of the discriminator 43 is coupled to a sample-and-hold and pulser (S/H-P) circuit 44. The pulser can comprise a monostable multivibrator which is free-running for a short duration until the charge placed on the sample-and-hold falls to a predetermined value. Accordingly, the circuit 44 will periodically produce a short duration (e.g., 2 nsec.) enabling pulse which is delivered to the gate 41. In normal operation the chips of the PSK signal will occur with sufficient regularity (e.g., at least once every ten PSK bits) to assure continual enabling pulses from circuit 44.

The enabling pulses delivered to the gate 41 serve to periodically enable the gate to selectively pass the transformed PSK signal, while rejecting the transformed, stronger CW signal(s). This is depicted illustratively in FIG. 1 where the transformed PSK pulse signals 22 and 23 fall within the gate window and thus are passed by the gate, while the transformed CW signal 21 falls outside the gate window and is therefore rejected by the gate. For reasons of timing, the delay 42 is designed to provide a short delay equal to the delay presented by the circuits 43 and 44.

It is conceivable that a transformed CW signal, such as the narrow spike 21, might fall within the gate window and hence be passed by gate 41. However, in view of the very short time period that gate 41 is enabled (2 nsec.) this likelihood is quite small.

Three important functions have been accomplished by the described circuit; one is that the transformed CW and PSK signals are separated in the time domain and the PSK signal is thus readily isolated from the strong CW; two is that processing gain has been applied to the low level PSK signal equal to the time-bandwidth product of the SAW Chirp-Z transform algorithm (this typically can be 20 dB); and three is that the transformed PSK signal will vary in amplitude each time a PSK phase transition coincides with one of the SLO sweeps.

The isolated, PSK output from gate 41 is delivered to a dual channel SAW differential delay line comprised of an ST-X quartz SAW substrate 45, with an input transducer 46 positioned thereon at or near the middle of the SAW device and a pair of output transducers 47 placed at spaced predetermined distances from said input transducer. As shown in FIG. 1, the output transducers 47 are disposed on either side of the input transducer 46 so as to yield a very compact structure. This compactness is achieved because the SAW delay device is bidirectional. That is, the signals delivered to the input transducer travel in both directions (e.g., forward and backward) therefrom. Each channel or path of the dual channel SAW delay line comprises the input transducer 46 and a respective one of the output transducers 47. The dual channel SAW differential delay line is covered in detail in applicants' copending application filed Nov. 1, 1985, U.S. Ser. No. 793,931 now U.S. Pat. No. 4,647,863.

Briefly, the two channels or paths of the SAW delay device are of different lengths ($D_1$, $D_2$) so as to provide the desired differential delay, $\Delta D = D_1 - D_2$; where, for example, $D_1 = V_a \cdot t_1$; and, $D_1$ is the distance in cm., $V_a$ is the acoustic velocity, and t is the time in usec. The desired differential delay ($\Delta D$) is equal to one PSK bit duration ($\tau$).

A SAW delay line is known to be very linear with frequency, with excellent phase linearity and wide bandwidth at UHF operating frequencies. The implementation herein of such a delay line, however, advantageously utilizes the described dual channel line to achieve the requisite short delay, and also so that feedthrough can be suppressed and the two channels normalized with respect to signal loss.

Figure 3:
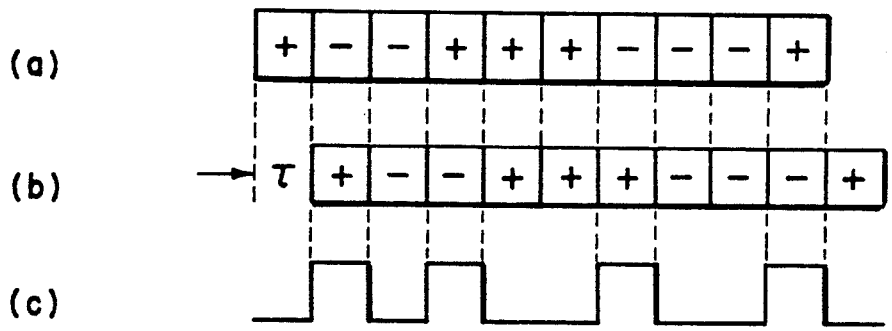
FIG. 3 is a simplified diagram depicting the inputs to and the output from the comparator of FIG. 1.

The output transducers 47 are coupled to a comparator 48 of conventional design, such as a Schmitt trigger-regenerative comparator. The comparator 48 serves to produce an output pulse when, and only when, the two inputs thereto are different (i.e., unequal). FIG. 3 is a simplified diagram which depicts the operation of the comparator 48. FIGS. 3a and 3b illustrate a block of transformed PSK bits from the two transducers 47. The aforementioned differential delay of SAW device 45 is equal to $\tau$ or one PSK bit length, and therefore the transformed bits from one output transducer are delayed one bit length with respect to the bits from the other output transducer. A plus bit in FIG. 3 serves to represent a zero phase shift condition in the input PSK signal, and a minus bit represents a 180° phase shift (or, alternatively, a transformed wide pulse 22). When the transformed PSK bits represented by FIGS. 3a and 3b are delivered to the comparator 48, the output represented by FIG. 3c results. The comparator serves to output a pulse when, and only when, the two inputs thereto differ. The four output pulses of FIG. 3c are indicative of the fact that the PSK input signal has four phase transitions 31-34. The output of comparator 48 is delivered to a conventional counter 49, which then counts the number of phase transitions in a given block of input PSK signals.

For reasons of descriptive simplicity the SLO sweep time was assumed equal to the bit duration of an input PSK signal. In practice, the SLO sweep time will typically be less than a PSK bit duration. The aforementioned differential delay of the SAW device 45 should therefore be equal to this reduced sweep time. In all other respects the circuit and its operation remain unchanged. Accordingly, while a specific arrangement or embodiment of the invention has been described in detail herein, it is to be understood that numerous variations and modifications thereof may be devised by those skilled in the art without departing from the spirit and scope of the invention.

What is claimed:

1. A circuit for detecting the phase transitions in an incoming PSK signal in the presence of stronger CW signals comprising means for carrying out a Chirp-Z transformation of said PSK and CW signals to separate said signals in the time domain, gate means for rejecting the transformed CW signals and for passing to the output thereof transformed PSK signals including signals indicative of transformed phase transitions is said PSK, delay means coupled to the output of said gate means for providing two versions of said transformed PSK signals wherein one version is delayed by a predetermined amount with respect to the other version, and comparator means for comparing the two versions of the transformed PSK signals and providing an output pulse when said two versions differ.

2. A circuit as defined in claim 1 including a counter for counting the output pulses from said comparator means.

3. A circuit as defined in claim 2 wherein said delay means comprises a dual channel SAW differential delay line, the two channels being of different lengths to provide the predetermined amount of delay therebetween.

4. A circuit as defined in claim 3 wherein the predetermined amount of delay is less than or equal to a PSK bit duration.

5. A circuit as defined in claim 4 wherein said gate means comprises a gating circuit, pulse width discriminator means for rejecting all pulses except the transformed phase transitions of the input PSK signal, and pulser means coupled to the output of said discriminator means for producing enabling signals which periodically enable the gating circuit to selectively pass the transformed PSK signal including said transformed phase transitions.

6. A circuit as defined in claim 5 wherein the Chirp-Z transform means comprises a mixer for receiving said incoming PSK and CW signals, a sweep local oscillator for generating a Chirp signal which is coupled to said mixer, and a surface acoustic wave (SAW) device coupled to the output of said mixer, said SAW device having a frequency-vs-time characteristic that is the inverse match of that of the sweep local oscillator.

7. A circuit as defined in claim 6 wherein said Chirp signal has a duration that is less than or no more than equal to a PSK bit duration.

8. Phase transition apparatus for detecting and counting the phase transitions in a low level PSK signal in the presence of a stronger CW signal comprising a mixer to which said PSK and accompanying CW signals are coupled, oscillator means for producing a linear sweep signal having a predetermined frequency-vs-time characteristic, said sweep signal having a sweep duration which is less than or equal to a PSK bit duration, means for coupling said sweep signal to said mixer for modulating said PSK and CW signals, a SAW delay device coupled to the output of said mixer, said SAW device having a frequency-vs.-time characteristic which is similar to yet opposite from that of the oscillator means, the output from said SAW delay device being a Chirp-Z transformation of the input PSK and CW signals with the transformed PSK and CW signals separated in the time domain, a gating circuit coupled to the output of said SAW device, a pulse width discrimator means also coupled to the output of said SAW device and serving to reject all signals except transformed phase transitions of the input PSK signal, pulser means coupled to the output of said discriminator means for producing enabling pulses which serve to periodically enable the gating circuit for short durations to selectively pass the transformed PSK signal including transformed phase transitions thereof, a dual channel SAW differential delay line coupled to the output of said gating circuit, the two channels of said SAW differential delay line being of different lengths to provide a predetermined amount of delay therebetween which is equal to said sweep duration, a comparator for comparing the output signals from the two channels of said SAW differential delay line and providing an output pulse when they differ, and a counter for counting the output pulses from the comparator.

* * * * *